UNITED STATES PATENT OFFICE.

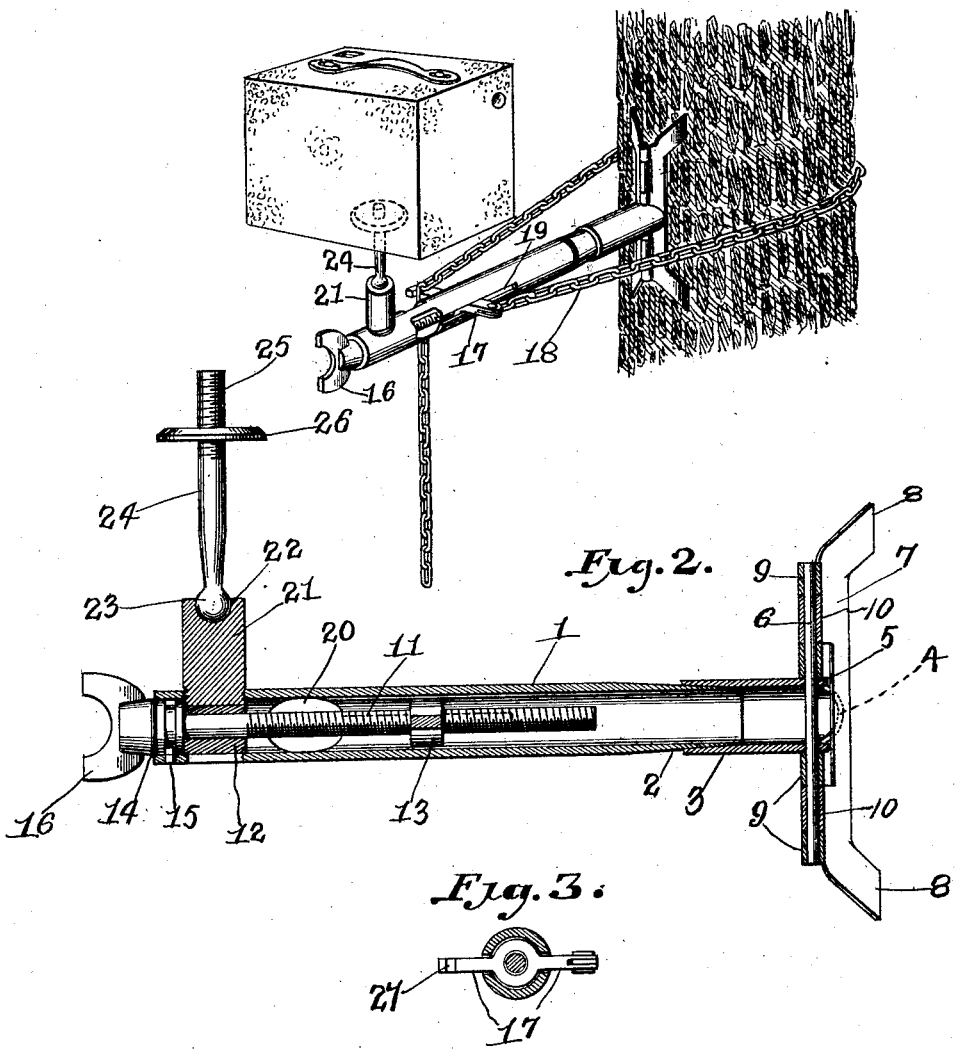

MARTIN L. MILLER AND HENRY B. STONER, OF BROOKVILLE, PENNSYLVANIA.

CAMERA STAND.

1,408,900.   Specification of Letters Patent.   Patented Mar. 7, 1922.

Application filed March 19, 1921. Serial No. 453,543.

*To all whom it may concern:*

Be it known that we, MARTIN L. MILLER and HENRY B. STONER, citizens of the United States, residing at Brookville, in the county of Jefferson and State of Pennsylvania, have invented certain new and useful Improvements in Camera Stands; and we do hereby declare the following to be a full, clear, and exact description of the invention, such as will enable others skilled in the art to which it appertains to make and use the same.

This invention relates to new and useful improvements in camera supports and more particularly to a device which can be quickly and readily attached to a tree, telephone pole, fence post or any other upright structure for supporting a camera, the main object being the provision of a device of this character which can be quickly placed in position and wherein the camera can be arranged in a perfectly level position for taking pictures regardless of the position of the object to which the support is attached.

Another object of the invention is the provision of a camera support including a body portion having hinged contacting members arranged at one end of the body and adapted to be disposed in divergent relation whereby to engage a stationary object and an adjustable member to embrace the object to bring the engaging members into close engagement with the stationary object whereby to support the body in a horizontal position and furthermore to provide a supporting member for a camera which can be readily adjusted to any desirable position regardless of the position of the body of the main support.

With the above and other objects in view the invention consists in the novel features of construction, combination and arrangement of parts hereinafter more fully set forth, pointed out in the claims and shown in the accompanying drawings in which:

Figure 1 is a perspective view of a camera support constructed in accordance with our invention, illustrating the application of the same;

Fig. 2 is a longitudinal sectional view, and

Fig. 3 is a transverse sectional view taken on the line 3—3 of Fig. 2.

In the construction of our invention we provide a tubular body member 1 having one end slightly tapered as shown at 2 and removably mounted upon the tapered end 2 is a sleeve 3, the outer end of said sleeve being provided with oppositely disposed inclined portions 4 and further provided with perforated ears 5 arranged between the inclined portions 4 adapted to receive a pivot bolt 6.

Mounted for swinging movement upon the bolt 6 are the clamping plates 7, each plate comprising an elongated body member having a diagonally disposed blade portion 8 extending from each end thereof for engagement with a stationary object when the two plates are arranged in an open position as illustrated in Fig. 1. One of the plates is provided with sleeve portions 9 arranged upon opposite sides of the center of the plate and at each end adapted to receive the pivot bolt 6, the other of said plates being provided with sleeves 10 arranged at a point adjacent each end thereof and adapted to be disposed between the sleeves 9 on the other plate and receive the pivot pin 6 whereby to form a suitable hinge connection between the two clamping members. It will be noted that when the clamping members are in their open positions as shown in Fig. 1, the body portions thereof rest against the inclined portions 4, this position being clearly illustrated in Fig. 2.

Mounted within the body portion 1, is an adjusting screw 11, said screw being supported at a point adjacent its outer end by means of the bearing sleeve 12 and the other end of the screw being threaded through an adjustable sleeve 13. Mounted upon the outer end of the screw 11 is a grooved collar 14 having a pin 15 carried by the body 1 engaging within the groove of the collar to prevent any sliding movement of the same but permitting a free rotating movement. Connected with the collar 14 is a winged finger piece 16 adapted to be grasped by the fingers of the operator for rotating the screw 11 to adjust the sleeve 13 within the body 1.

Extending outwardly from opposite sides of the sleeve 13 are the two arms 17, one of said arms having a chain or other suitable connecting element attached thereto adapted to be extended around the stationary object with which the clamping members 7 are engaged and then connected to the arm on the opposite side of the body 1 as shown in Fig. 1, and through the adjustment of the screw 11, the binding element which is herein shown as a chain 18 can be quickly and readily tightened for retaining the clamping members into engagement with the stationary object whereby to support the body 1 in a horizontal position with respect to the object to which the device is attached. It will be noted that the body member 1 is provided with a longitudinal slot 19 upon opposite sides thereof through which the ends of the arms 17 project. The body is further provided with aligned openings 20 formed at one end of the slots 19 whereby the sleeve 13 can be readily removed from the body if desired.

The camera support which is detachably connected to the body member 1 comprises a base portion in the form of a cylindrical standard 21, the inner end of which is threaded into a suitable opening in one side of the body 1 and said standard being provided at its upper end with a socket 22 adapted to receive the ball end 23 of the post 24. The upper end of the post 24 is threaded as shown at 25 so that the camera can be readily screwed down to the upper end of the post 24, the post taking the place of the threaded member on the usual well known tripod support for cameras and mounted upon the post is a base plate 26 adapted to engage the bottom of the camera to assist in its support.

From the above description taken in connection with the accompanying drawings, it will be readily apparent that we have provided a camera stand of simple construction which can be quickly and readily placed in position by attaching the same to a tree, post or any other stationary object of this character and the camera positioned on a level regardless of the position of the stationary object to which the support is attached. It will also be noted that the several parts can be quickly assembled or taken apart so that the device can be carried in a small compact bundle when not in use as the sleeve 3 can be quickly and readily detached from one end of the body 1 while the cylindrical support 21 can be removed from the body 1 by unscrewing the same from the opening. In the operation of the device the clamping plates 7 are placed against the stationary object, the chain 18 is then extended around the object and engaged with the hook 27 on one of the arms 17 and the finger piece 16 manipulated for adjusting the screw 11 to tighten the chain 18 thus forcing the clamping plates 7 into secure engagement with the object. The camera can then be screwed down to the upper end of the post 24 and readily adjusted to a level position regardless of the position of the object to which the device is attached.

We claim:

1. A device of the class described including a tubular body member, a sleeve removably mounted upon one end thereof, hinged clamping members connected with said sleeve and adapted to engage a stationary object, movable arms carried by the body, a binding element having one end connected with one of said arms and the other end extended around the stationary object and detachably connected to the other arm, means for adjusting said arms with respect to the body and movable means carried by the body for supporting a camera in various positions.

2. A device of the class described including a tubular body member, a sleeve removably mounted upon one end thereof, hinged engaging plates carried by the sleeve for engagement with the stationary object, adjustable arms supported by the body and projecting from each side thereof, a binding element having one end connected to one of said arms and its other end extending around the stationary object and detachably connected with the other arm, means for adjusting said arms with respect to the body, a standard member detachably connected to the body and a supporting post universally connected with the standard for supporting a camera in various adjusted positions.

3. A device of the class described including a tubular body member, hinged clamping members removably mounted upon one end of said body and adapted to be disposed in divergent relation for engagement with the stationary object, a sleeve movable within the body, arms carried by the sleeve and projecting outwardly from the body, a binding element having one end connected to one of the arms and the other end passed around the stationary object and detachably connected with the other arm, an adjusting screw carried by the body and threaded through the sleeve, whereby turning movement of the screw will adjust the arms with respect to the body to tighten the binding element and a camera supporting post mounted for adjustment and support by the body.

4. A device of the class described including a body member, hinged clamping plates carried by one end of the body for engagement with the stationary object, a sleeve movable in the body, arms extending from opposite sides of said sleeve to the exterior of the body, a binding element having one end connected to one of the arms and the other end extending around the stationary object and detachably connected to the other arm, a screw member arranged within the body and threaded through the sleeve whereby turning movement of the screw will adjust the sleeve for tightening the binding element, a standard detachably connected to the body and extending at right angles thereto and a camera supporting post universally connected to the standard.

5. A device of the class described including a tubular body member, a sleeve mounted upon one end thereof, clamping members carried by the sleeve and adapted to engage a stationary object, movable arms supported by the body, a binding element carried by the arms and adapted to embrace the stationary object and means for adjusting said arms with respect to the body.

In testimony whereof we affix our signatures.

MARTIN L. MILLER.
HENRY B. STONER.